United States Patent [19]
Williams

[11] Patent Number: 6,024,228
[45] Date of Patent: Feb. 15, 2000

[54] BYPASS DIVERTER BOX FOR DRILLING MUD SEPARATION UNIT

[75] Inventor: J. Terrell Williams, Lake Charles, La.

[73] Assignee: Tuboscope Nu-Tec/GNT, Lake Charles, La.

[21] Appl. No.: 09/146,523

[22] Filed: Sep. 3, 1998

Related U.S. Application Data

[60] Provisional application No. 60/061,620, Oct. 9, 1997.

[51] Int. Cl.$^7$ ............................... B07B 1/00; B07B 1/10; B01D 33/04
[52] U.S. Cl. ...................... 209/272; 209/253; 209/246; 209/307; 210/400; 210/783
[58] Field of Search ..................... 209/272, 253, 209/240, 243, 246, 307; 210/400, 783, 420, 421, 456

[56] References Cited

U.S. PATENT DOCUMENTS

| | | |
|---|---|---|
| 2,446,293 | 8/1948 | Minyard ................................. 210/403 |
| 3,446,349 | 5/1969 | Benzon .................................. 209/246 |
| 3,975,275 | 8/1976 | Kato ...................................... 210/160 |
| 4,120,790 | 10/1978 | Tinker et al. ............................ 210/65 |
| 4,140,629 | 2/1979 | Martindale .............................. 209/240 |
| 4,366,058 | 12/1982 | Wolde-Michael ....................... 210/519 |
| 4,783,266 | 11/1988 | Titch et al. .............................. 210/695 |
| 5,853,583 | 12/1998 | Shah ....................................... 210/340 |
| 5,863,430 | 1/1999 | Williams ................................. 210/400 |
| 5,921,399 | 7/1999 | Bakula et al. .......................... 209/272 |

*Primary Examiner*—Donald P. Walsh
*Assistant Examiner*—Daniel K. Schlak
*Attorney, Agent, or Firm*—Finnegan, Henderson, Farabow, Garrett & Dunner, L.L.P.

[57] ABSTRACT

A bypass diverter box disposed upstream from conventional solids control equipment of a mud system of a drilling rig contains a drilling mud separation unit having a continuous-loop scalper screen that is driven in a continuous loop to separate, convey and discharge large amounts of gumbo, heavy clays and drill solids at the end of the separation unit. The flow divider box is a box-like housing with a verter plate, upper and lower baffle plates and a grate that allows drilling fluid or drilling mud to be selectively directed to the mud separation unit to be separated prior to passing to the conventional downstream solids control equipment or allows the fluid to bypass the separation unit and flow directly to the conventional solids control equipment. The bypass diverter box baffle plates, diverter plate and grate, and selective utilization of the mud separation unit removes large amounts of gumbo, heavy clays and drill solids from the drilling mud and allows high flow rates to be easily processed by shale shakers and other conventional downstream solids control equipment of the mud system and compliments the drilling operations with respect to changes in the lithology, geological formations, or loss of returns in relation to the gallons pumped or folume of drilling fluid or drilling mud entering the bypass diverter box.

3 Claims, 7 Drawing Sheets

BYPASS DIVERTER BOX FOR DRILLING MUD SEPARATION UNIT

This application claims benefit of provisional application 60/061620, filed Oct. 9, 1997.

BACKGROUND OF THE INVENTION

Field of the Invention

The invention relates to drilling mud control equipment, and more particularly to a bypass diverter box with a diverter plate, baffle plates and a grate that allows drilling fluid or drilling mud to be selectively directed to a drilling mud separation unit contained therein or to bypass the separation unit prior to passing it to conventional downstream solids control equipment and to selectively control the fluid properties to be passed to downstream conventional solids control equipment.

BRIEF DESCRIPTION OF THE PRIOR ART

The mud system is an integral part of an oil and gas drilling rig, land or marine. Drilling mud or drilling fluid is continually recycled because of the huge cost factor and for environmental reasons. The drilling mud or drilling fluid is used to hold formation pressures in balance, to create and maintain well bore filter cake, create hydraulic horsepower at the bit, hydrostatic testing, shifting of spherical valve elements downhole, and removal of formation solids, cuttings, sand, etc., through the mud return annulus. As the drilling mud or drilling fluid flows from the bell nipple flow line its solids content is refined and removed, through a series of solids control equipment, each removing or separating the plate-like mica structure to a smaller physical size.

It is of the utmost advantage to remove as much solids as practical to reduce down time resulting from plugged flow lines, fluid end repair, drill string erosion, redrilling of the solids or sediments as the drilling mud or drilling fluid recycles itself through the mud system loop.

The conventional mechanical solids control equipment used for removing solids from drilling mud or drilling fluid involves shale shakers and vibratory screens, desilters, desanders, mud cleaners, and centrifuge. This equipment operates at different levels of particle size rejecting solids and retaining desirable solids which can be part of the drilling mud or drilling fluid additives or chemicals.

The mechanical shale shaker screens are limited to short life, and the screens become coated with sticky clays closing the pores or mesh openings resulting in fluid or mud loss. This adds to the problem as additional water must be added to the drilling mud system. This involves the addition of chemical and mud additives to restore the correct and desired mud properties and mud weight, hence the cost of drilling is increased.

The present invention overcomes the aforementioned drawbacks and disadvantages of the prior art and provides additional advantages as well.

The present invention is installed in the flow path of the drilling mud or drilling fluid in the mud system of a drilling rig, upstream of the conventional solids control equipment, and while drilling virgin or young shales it selectively separates and discharges large amounts of drill solids, gumbo, and heavy clays, from the drilling mud or drilling fluid prior to it flowing to the conventional solids control equipment or allows the separation unit to be bypassed. The present bypass diverter box employing baffle plates, diverter plate and grate, and selective utilization of the mud separation unit removes large amounts of gumbo, heavy clays and drill solids from the drilling mud and allows high flow rates to be easily processed by shale shakers and other conventional downstream solids control equipment of the mud system and compliments the drilling operations with respect to changes in the lithology, geological formations, or loss of return in relation to the gallons pumped or volume of drilling fluid or drilling mud entering the bypass diverter box.

SUMMARY OF THE INVENTION

A bypass diverter box disposed upstream from conventional solids control equipment of a mud system of a drilling rig contains a drilling mud separation unit having a continuous-loop scalper screen that is driven in a continuous loop to separate, convey and discharge large amounts of gumbo, heavy clays and drill solids at the end of the separation unit. The flow divider box is a box-like housing with a diverter plate, baffle plates and a grate that allows drilling fluid or drilling mud to be selectively directed to the mud separation unit to be separated prior to passing to the conventional downstream solids control equipment or allows the fluid to bypass the separation unit and flow directly to the conventional solids control equipment.

The mud separation unit is removably installed in the flow divider box and is equipped with a wide tensioned chain-link mud scalper screen driven in a continuous loop around a toothed drive roller and a rear roller propelled by a motor through a gear reduction box. The separation unit is geometrically positioned on rails a predetermined distance apart on the sides of the flow divider box at an angle less than vertical.

The accompanying drawings, which are incorporated in and constitute a part of this specification, illustrate one embodiment of the present invention and together with the description, serve to explain the principles of the present invention.

DETAILED DESCRIPTION OF THE PRESENT INVENTION

Referring now to FIGS. 1–4, the bypass diverter box 10 is a box-like housing having opposed side walls 10A and 10B, front end wall 10C (discharge end), and back end wall 10D (inlet end), and a bottom wall 10E. The box 10 has a horizontal motor support plate 11 on one or both side walls on which a variable or fixed-speed drive motor with gearbox 12 is mounted to drive a drilling mud separation unit 30 (described hereafter). A pair of elongate laterally opposed rails 13 are mounted on the inside of the opposed side walls and slidably receive and support the drilling mud separation unit 30 (shown in dashed line). The rails 13 are fixed in the bypass diverter box at an angle that is preferable from about 70° about 80° from vertical, measuring from the back wall 10D, or any other suitable angle. The side walls also have cutouts 10F at their front ends to allow the front axle and drive sheave of the drilling mud separation unit to extend through either side of the bypass diverter box.

The box 10 has an inlet opening 10G in the upper portion of the back wall 10D (inlet end) through which drilling mud or drilling fluid enters, a discharge outlet 14 at the lower front portion of either of the side walls 10A, 10B, and a cleanout outlet 15 through the bottom wall 10E at its juncture with the back wall 10D. A rectangular cover or top plate 16 encloses the open top end of the box 10. A discharge chute or hopper 17 may be installed on the front end of the box to receive and direct large materials passing over the end of the drilling mud separation unit to a suitable location.

A lower baffle plate 18 disposed a distance inwardly from the back wall 10D extends vertically upward a distance above the bottom wall 10E and is secured to the laterally opposed side walls 10A, 10B defining a lower opening 19 between the bottom of the baffle plate 18 and the bottom wall. An upper baffle plate 20 disposed a distance inwardly from the back wall 10D in axial alignment with the lower baffle plate 18 extends vertically upward a distance above the top of the baffle plate 18 and is secured to the laterally opposed side walls 10A, 10B defining an upper opening 21 between the baffle plates. A rectangular bar or stop plate 22 is secured to the inside of the back wall 10D and extends horizontally outwardly a short distance therefrom toward the front wall 10C.

Figure 1:
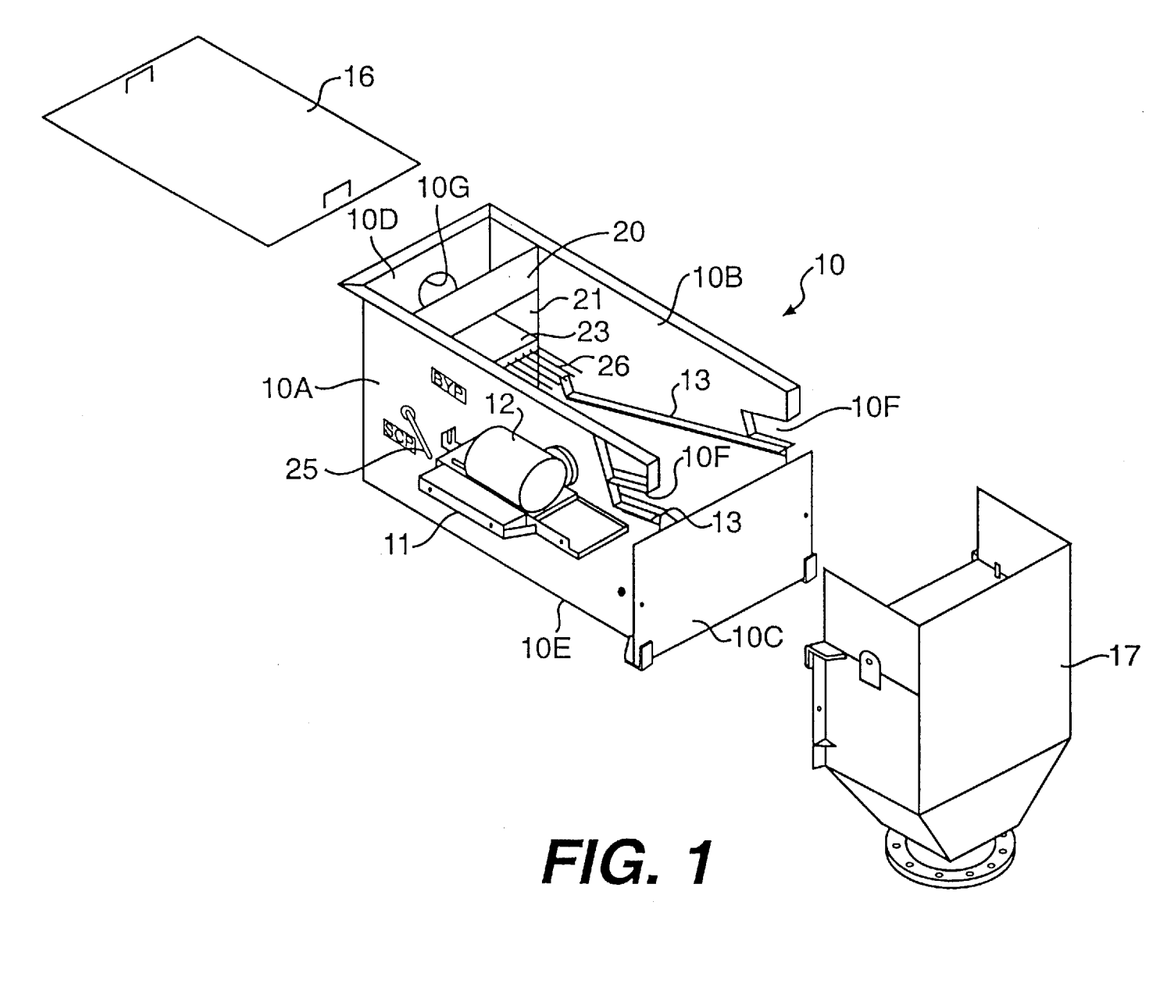
FIG. 1 is an isometric drawing of the bypass diverter box in accordance with the present invention.
Figure 2:
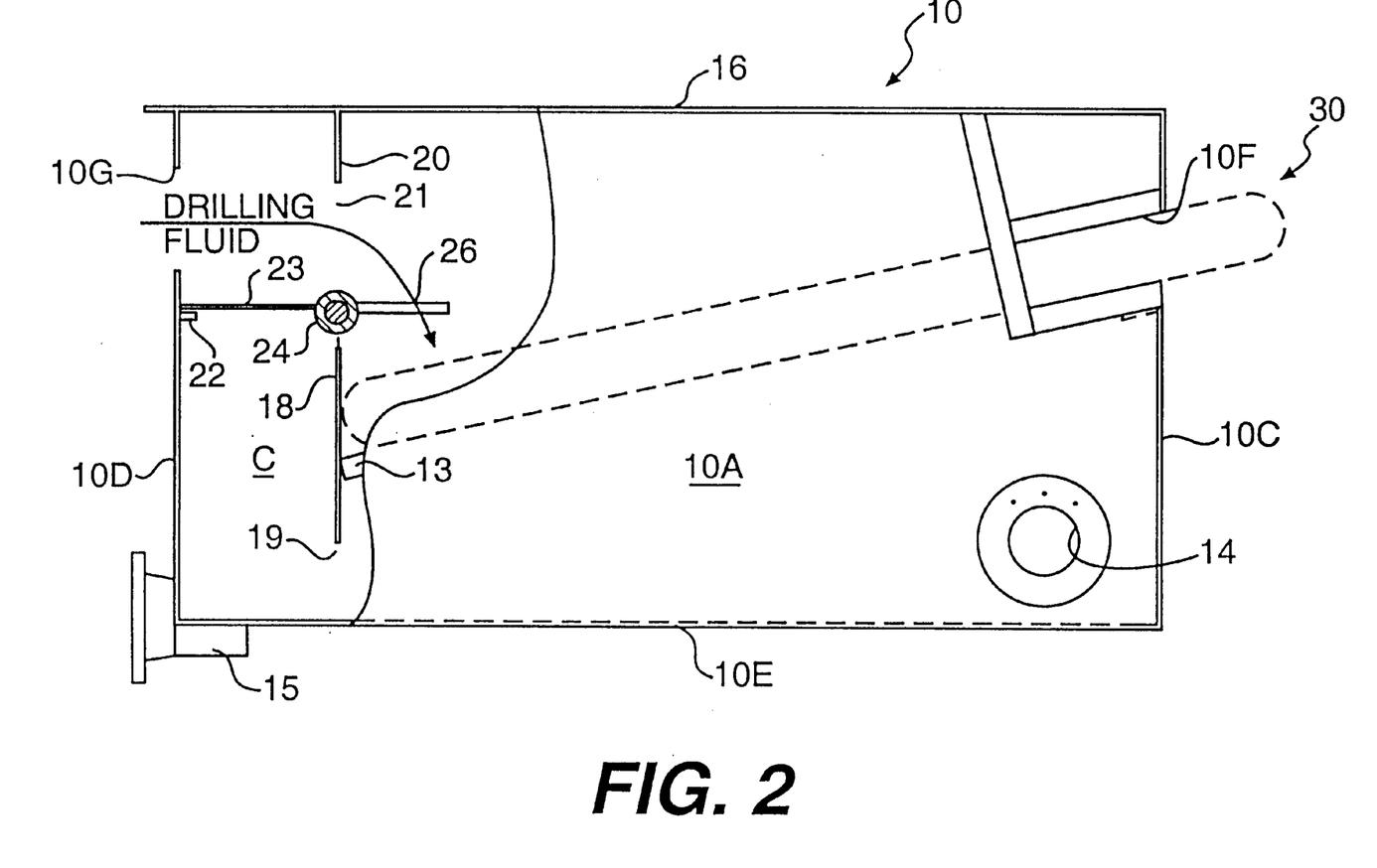
FIG. 2 is a side elevation in partial cross section of the bypass diverter box showing the diverter plate in a horizontal position.
Figure 3:
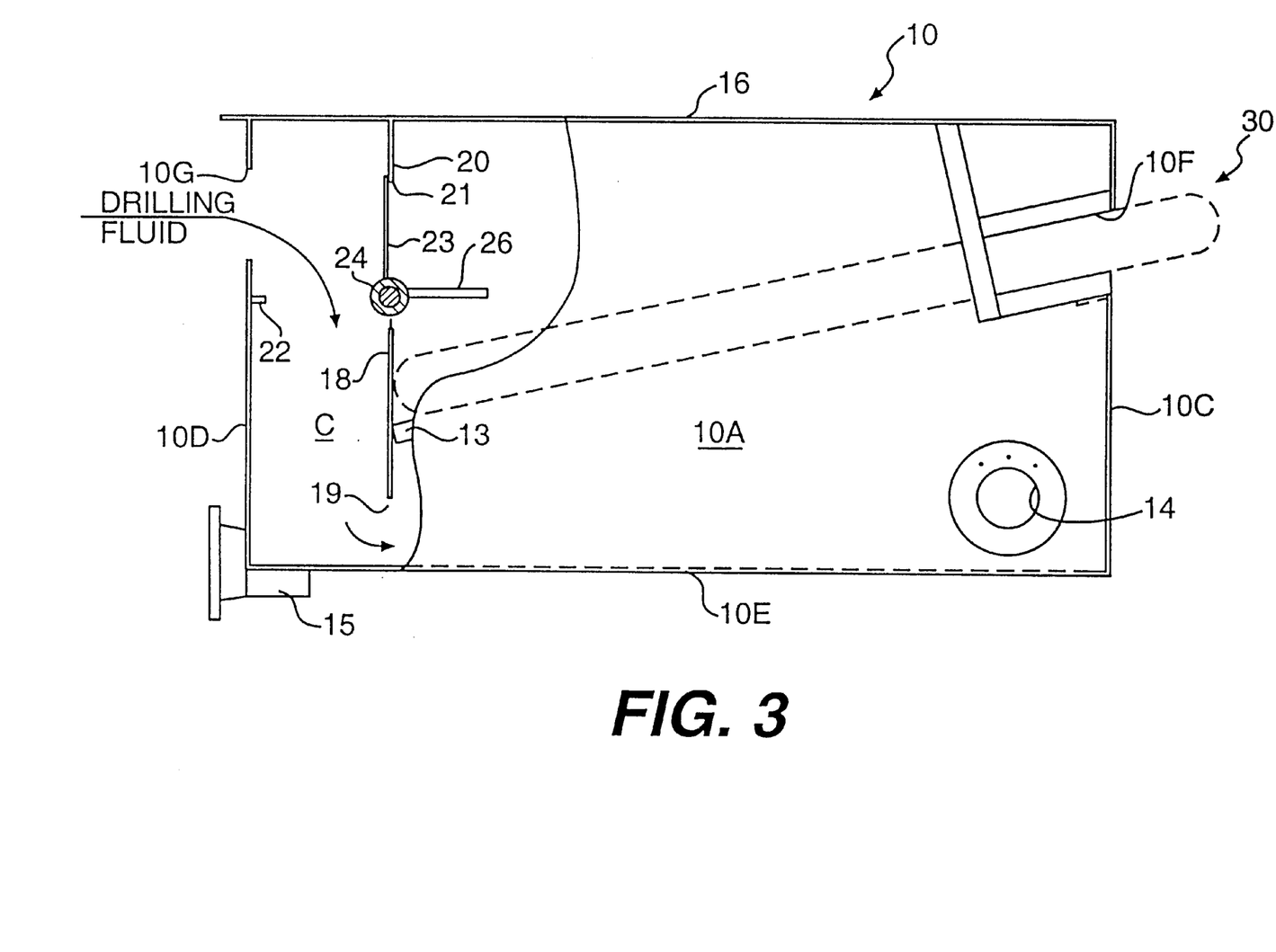
FIG. 3 is a side elevation view in partial cross section of the bypass diverter box showing the diverter plate in a vertical position.
Figure 4:
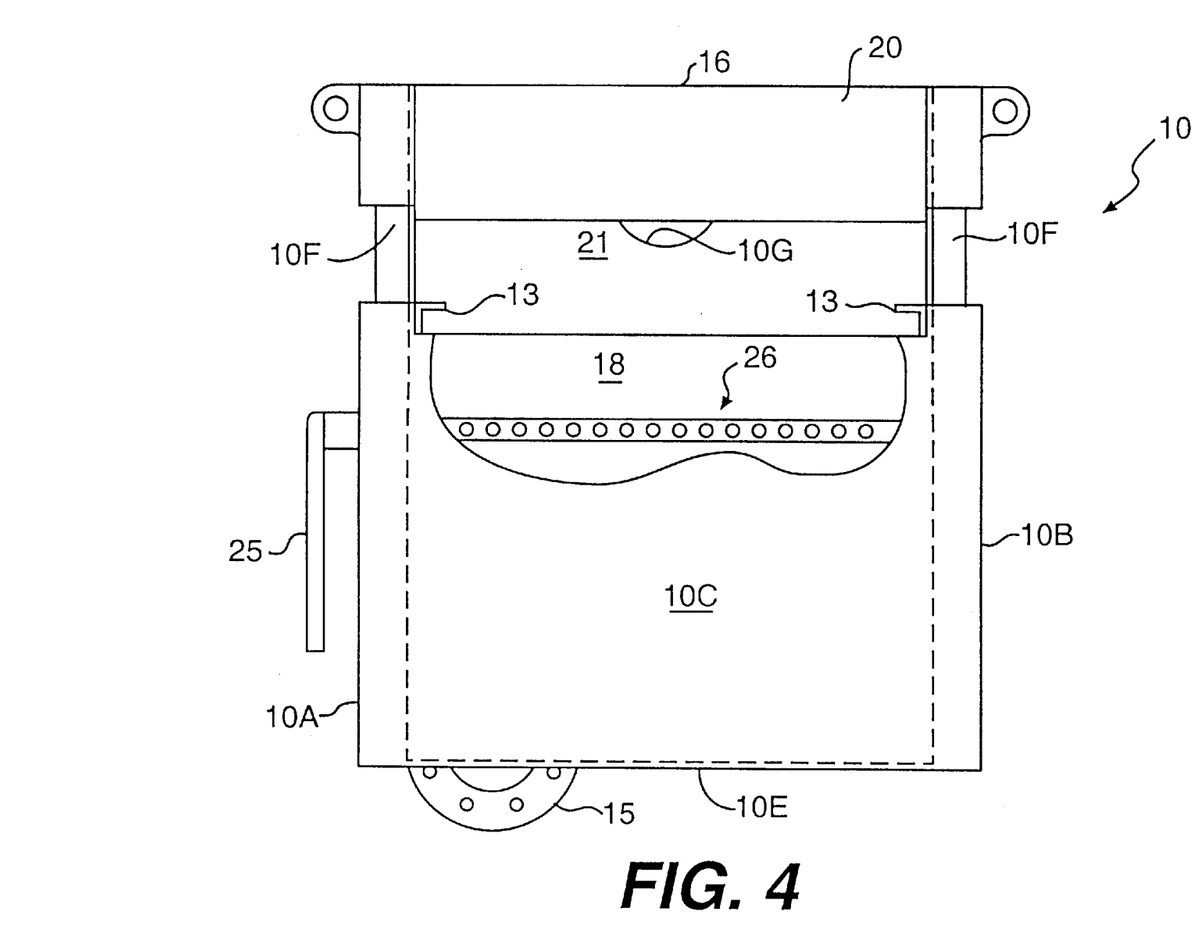
FIG. 4 is a front end view of the bypass diverter box shown partially in cross section.

A pivotal rectangular rudder or diverter plate 23 is secured along one longitudinal edge to a transverse axle 24 having opposed ends extending rotatably through flange hubs with phenolic bearings and grease fittings. The phenolic bearings resist caustic materials in the drilling mud or drilling fluid. A pivot arm or lever 25 is installed on one of the outer ends of the axle 24 for rotating or pivoting the rudder or diverter plate 23 about the axis of the axle between a horizontal position as seen in FIG. 2 and a vertical position as seen in FIG. 3. A grate 26 formed of parallel laterally spaced bars or rods extends transversely between the side walls 10A and 10B and a distance horizontally outward from the axle 24 toward the front wall 10C.

In the horizontal position (FIG. 2) the rudder or diverter plate 23 is disposed horizontally with one end supported on the stop plate 22 to form a shelf or ledge which closes off the lower compartment C between the back wall 10D and the lower baffle plate 18. In this position drilling mud or drilling fluid including gumbo, heavy clay and large drill solids entering through the inlet opening 10G in the back wall 10D flows across the rudder or diverter plate 23 and across the grate 26 onto the scalper screen of the drilling mud separation unit 30. The grate 26 dislodges solids and laminates the flow of drilling fluid and directs the gumbo, heavy clays, and large drill solids onto the scalper screen of the drilling mud separation unit 30 which then passes them off of the discharge end of the scalper screen. The drilling mud or drilling fluid containing smaller particles pass through the array of openings in the scalper screen and enter the compartment beneath the drilling mud separation unit and are conducted through the discharge outlet 14 to the downstream conventional solids control equipment.

In the vertical position (FIG. 3), the rudder or diverter plate 23 is disposed vertically with one end engaged on the upper baffle plate 20 closing off the upper opening 21 between the upper and lower baffle plates 20 and 18. In this position, drilling mud or drilling fluid including gumbo, heavy clays and large drill solids entering through the opening 10G in the back wall 10D is directed downwardly by the rudder or diverter plate 23 and flows into the compartment C between the back wall 10D and the lower baffle plate 18 and through the lower windor or opening 19 allowing the drilling mud or fluid in the compartment to be conducted through the discharge outlet 14 to the downstream conventional solids control equipment, thereby bypassing the drilling mud separation unit.

Figure 5:
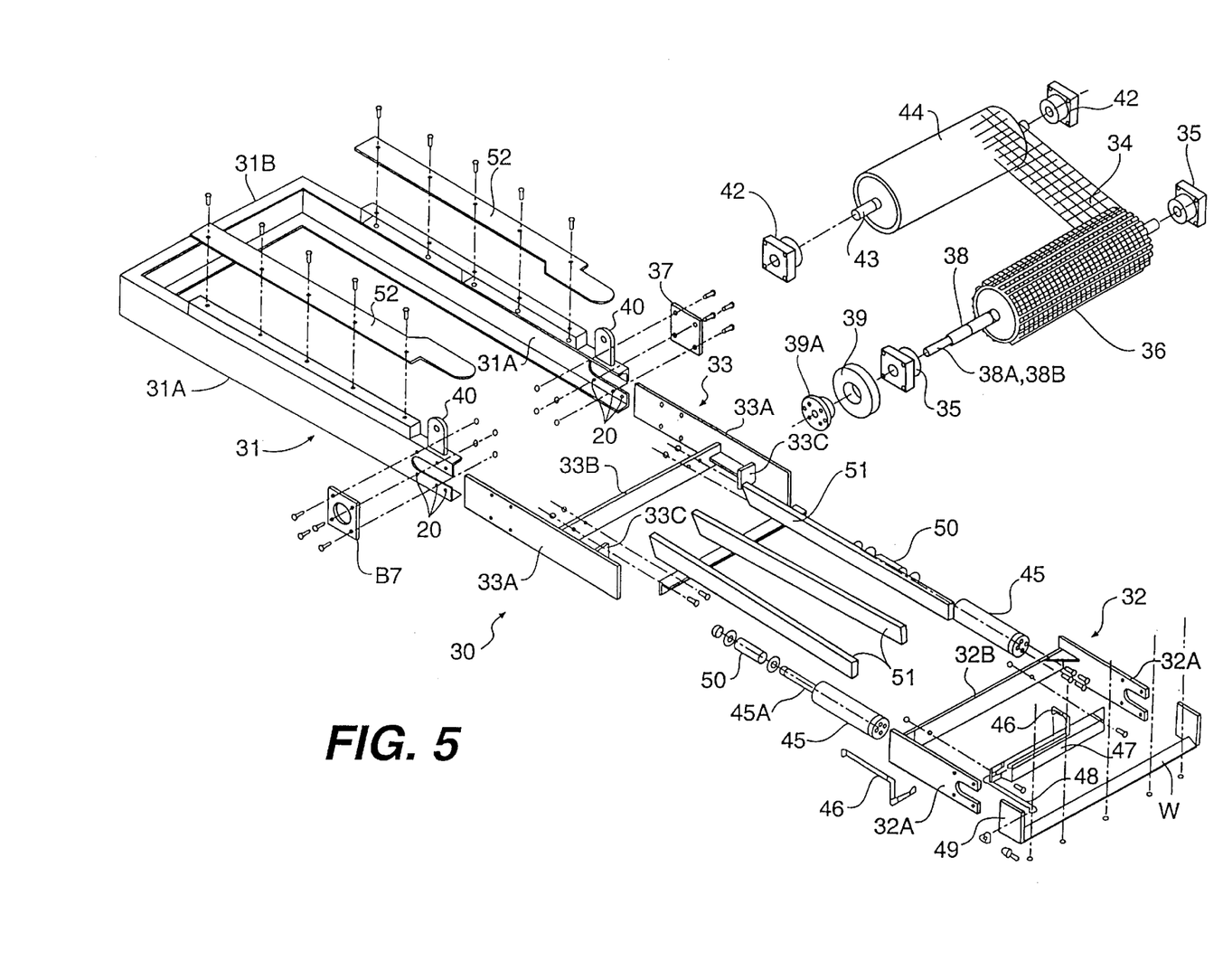
FIG. 5 is an exploded isometric view of the mud separation unit in an unassembled condition.
Figure 6:
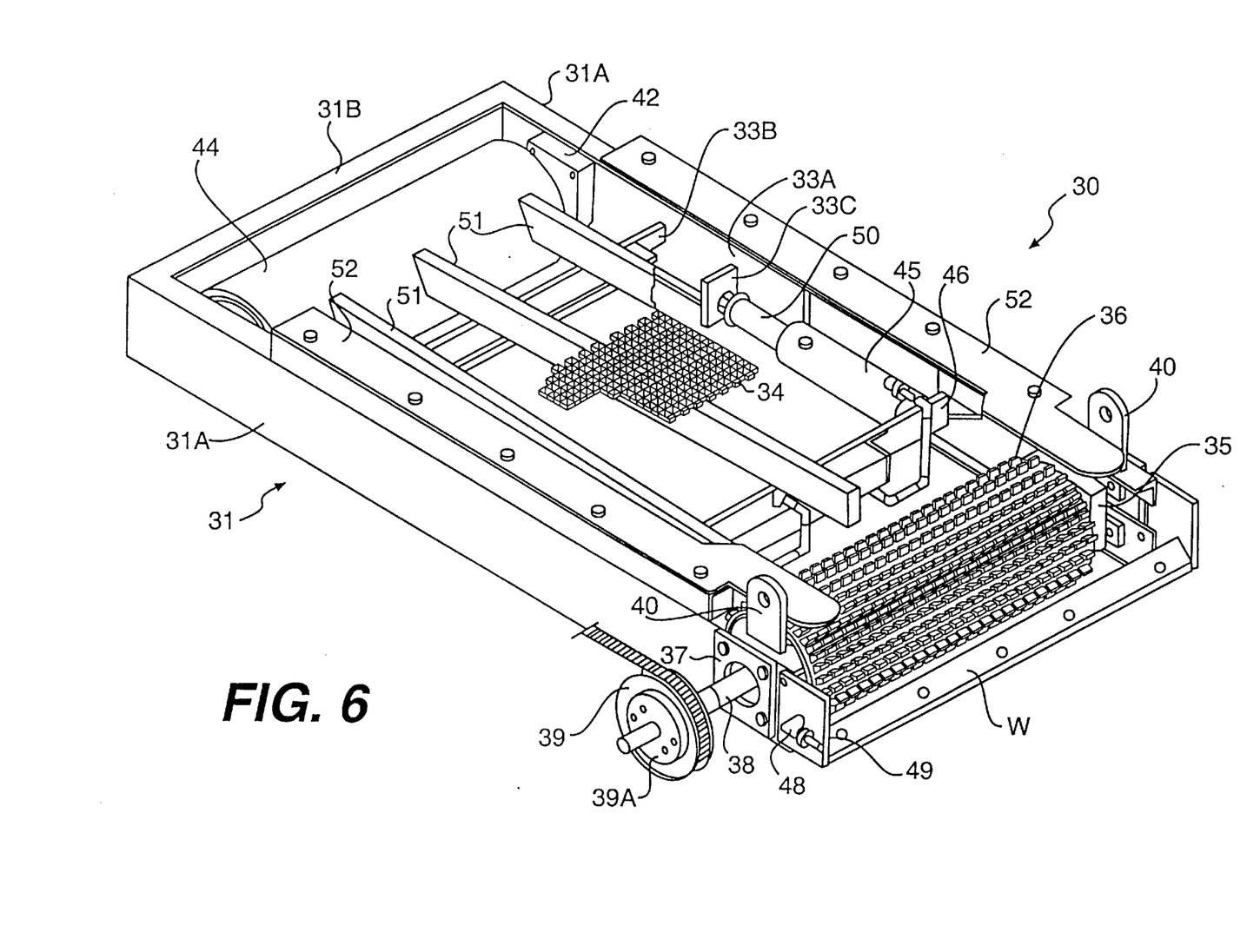
FIG. 6 is an isometric view of the mud separation unit in an assembled condition.

Referring now to FIGS. 5 and 6, the drilling mud separation unit 30 which is installed in the bypass diverter box 10 has a generally rectangular outer frame assembly 31 formed of side and rear C-shaped channel members 31A and 31B, respectively, that supports an inner front tensioning frame assembly 32, an inner rear tensioning frame assembly 33, and other components.

The separation unit 30 is shown in an unassembled condition in FIG. 5 and in an assembled condition in FIG. 6. The endless-loop chain link belt 34 is shown schematically in FIGS. 5 and 6, but is shown in greater detail in FIGS. 7 and 8.

The inner front tensioning frame assembly 32 is a generally U-shaped configuration formed of a pair of laterally opposed rectangular side plate members 32A with a transverse rectangular crossmember plate 32B secured between the inner facing ends of the side plates. Front bearings 35 are mounted at the outer ends of the opposed plates 32A. The U-shaped inner front tensioning frame assembly 32 carrying the front bearings 35 and drive roller 36 is fixedly connected to the front end of the outer frame assembly 31 by spacer plates 37. The axle 38 of the front drive roller 36 is journalled in the front bearings 35 and its outer ends extend through the front bearings 35 and through the outer frame assembly 31 to receive a drive sheave 39 on either the right or left side of the outer frame 31. Thus, the drive sheave 39 can be located on either the left or the right side of the outer frame 31. A keyway 38A, key 38B, and retainer hub 39A secure the drive sheave 39 onto the axle 38.

Lifting eyes 40 are secured to the front end of the outer frame assembly 31 to lift and move the separation unit 30 as required. The inner front tensioning frame assembly 32, spacer plates 37, and the front bearings 35 are attached to the outer frame assembly 31 to make the front of the separation unit 30 rigid. Holes 41 are located on the front of the outer frame assembly 31 to attach the inner front tensioning frame assembly 32, front bearings 35, and spacer plates 37.

The inner rear tensioning frame assembly 33 is a generally H-shaped configuration formed of a pair of laterally opposed rectangular side plate members 33A with a transverse rectangular crossmember plate 33B secured between the side plates and laterally opposed end plates 33C secured near the front ends of the side plates. Rear bearings 42 are mounted at the rear ends of the opposed plates 33A. The axle 43 of the rear roller 44 is journalled in the bearings 42. The H-shaped inner rear tensioning frame assembly 33 carrying the rear bearings 42 and rear roller are not rigidly connected to outer frame assembly 31. Instead, the inner rear tensioning frame assembly 33 is slidably received in the C-shaped side channels of the outer frame 31.

Tensioning cylinders 45 are mounted on the inner front tensioning frame assembly 32 and the outer ends of their piston rods 45A are connected to the end plates 33C at the front ends of the side plates 33B of the inner rear tensioning frame assembly 33. Fluid lines 46 connect the tensioning cylinders 45 to a reservoir 47 which is mounted on the transverse crossmember 32B of the inner front frame assembly 32. The reservoir 47 contains a fluid medium (air or hydraulic) with which to operate the tensioning cylinders 45. A fluid line 48 connected to the reservoir 32 extends through a mounting plate 49 attached to the side of the outer frame assembly 31. An air or hydraulic supply line from the rig may be connected to the line 48 to supply air or hydraulic fluid to the tensioning system.

The outer ends of the piston rods 45A of the tensioning cylinders 45 are connected to the end plates 33C at the front ends of the side plates 33B of the inner rear frame assembly 33. The inner rear frame assembly 33 and rear roller 44 are moved along the C-shaped side channels of the outer frame 31 relative to the outer frame by the tensioning cylinders 45.

Thus, the inner rear tensioning frame assembly 33 carrying the rear roller 44 slides relative to the outer frame 31 and inner front tensioning frame assembly 32 upon extension or retraction of the piston rods 45A of the tensioning cylinders 45. When the piston rods 45A are extended the inner rear frame assembly 33 and rear roller 44 move rearwardly to apply and maintain tension in the moving chain link belt 34. Tubular collars or spacers 50 may be installed on the piston rods 45A to prevent them from retracting and mtain the tension in the belt 34.

A pair of laterally opposed parallel elongate rectangular guide/support bars 51 are connected at one end to the crossmember 33B of the inner rear tensioning frame assembly 33 and extend forward toward the front of the separation unit 30 and over the crossmember 32B of the inner front tensioning frame assembly 32 to support the chain link belt 34. The guide/support bars 51 move with the inner rear tensioning frame assembly 33 relative to the outer frame 31 as tension is applied or relaxed by the tensioning cylinders 45.

A pair of elongate flat guard rails 52 are mounted at the top ends of the C-shaped channels of the outer frame 31 after the moving chain link belt 34 is installed. The guard rails 52 extend inwardly from the sides of the outer frame assembly 31 over the lateral edges of the moving chain link belt 34 and forwardly over the lateral ends of the drive roller 36.

The drive roller 36 and hence the chain link belt 34 is driven by the variable or fixed speed motor mounted on the bypass diverter box 10 and connected to the drive sheave 39 on the outwardly extended end of the drive roller drive shaft 38.

Figures 7, 8:
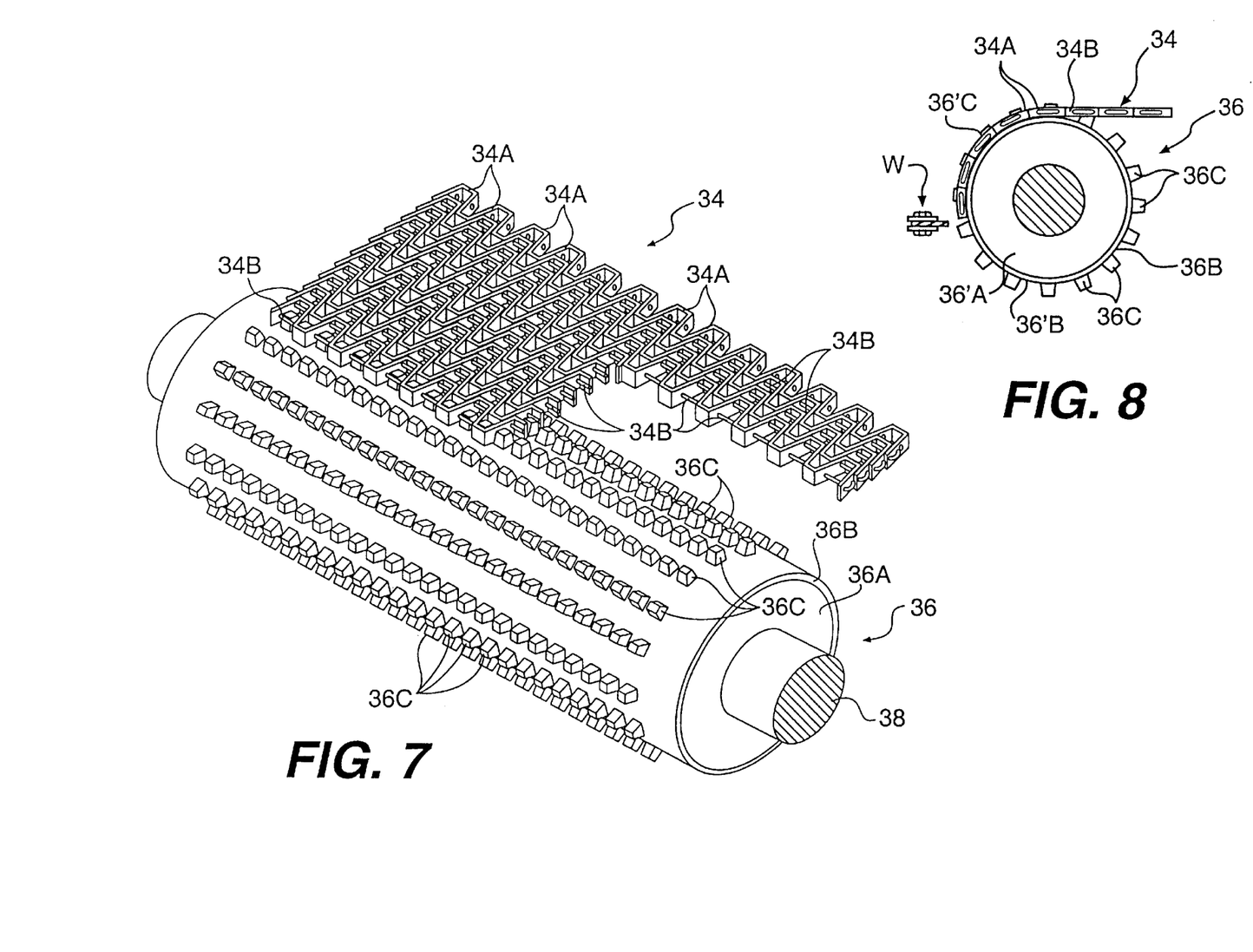
FIG. 7 is an isometric view showing the drive roller and chain-link mud separation belt.
FIG. 8 is a side elevation view of the drive roller and chain-link mud separation belt.

Referring now additionally to FIGS. 7 and 8, the wide endless-loop chain link belt 34 passes around the front drive roller 36 and rear roller 44. The front drive roller 36 which is used to drive the wide chain link belt 34 has a plurality of axially spaced circumferential spaced rows of radially extending teeth 36C. The self-cleaning chain link belt 34 is a wide endless loop belt formed of a plurality of adjacent jointed chain links 34A hingedly connected together by a plurality of parallel spaced transversely extending rods 34B. The endless loop chain link belt 34 passes around the front drive roller 36 and rear roller 44. As explained in detail hereinafter, the teeth 36C of the drive roller 36 are sized and spaced to be received in the apertures of the jointed chain links 34A. As shown in FIG. 7, the teeth 36C are of sufficient length to protrude slightly beyond the outer surface of the links 34A as they pass around the front drive roller 36. The toothed front drive roller 36 and chain link belt 34 arrangement is particularly useful in removing gumbo and other large solids which may otherwise stick in the openings of the links and clog the belt. As shown somewhat schematically in FIG. 8, a rectangular wiper blade W formed of resilient elastomeric material sandwiched between two rectangular metal straps may be secured transversely across the front of the frame to wipe the outer surface of the chain link belt 34 as it passes around the drive roller 36.

The moving chain link belt 34 is rotated around the drive roller 36 in an endless loop and passes underneath the separation unit 30 toward the rear roller 44. The moving chain link belt 34 then passes around the rear roller 44 and moves underneath the flow of drilling mud or drilling fluid from the well bore where large solids and gumbo from the well bore are deposited on the moving chain link belt 34. The moving chain link belt 34 continues forward movement across the guide/support bars 43 to the front drive roller 36.

As the drilling mud or drilling fluids along with the drill solids and gumbo to be separated flow across the moving chain link belt 34, the liquid part of the drilling mud or drilling fluid along with smaller particles of drill solids fall through the openings of the chain link belt 34 and into the bypass diverter box 10 as described above. Larger drill solids and gumbo are caught on the moving chain link belt 34 and are transported to the front of the separation unit 30.

As the moving chain link belt 34 passes under the front drive roller 36, the large drill solids and gumbo are discharged off the moving chain link belt 34 into a suitable discharge receptacle, pipe, conveyor, or other means as may be provided at each unit location. The teeth 36C of the drive roller 36 are received in the apertures of the jointed chain links 34A and protrude therethrough to dislodge and remove gumbo and other large solids which may be stuck in the openings of the links to clean and unclog the blet in each pass of the links 34A around the front drive roller.

Other embodiments of the present invention will be apparent to those skilled in the art from consideration of the specification and practice of the invention disclosed herein. It is intended that the specification and examples be considered as exemplary only, with a true scope and spirit of the invention being indicated by the following claims.

What is claimed is:

1. A bypass diverter box for use with solids control equipment of a drilling rig, comprising a housing, a drilling mud separation apparatus mounted within said housing, said apparatus including a continuous-loop scalper screen having means for driving said screen in a continuous loop to separate, convey and discharge solids from drilling mud or drilling fluid and discharge said solids at one end of said housing remote from another end of said housing at which said drilling mud or drilling fluid is introduced to said housing, a diverter plate adjustably mounted within said housing on an axle extending between opposed side walls of said housing and adjacent said another end of said housing for regulating amounts of said drilling mud or drilling fluid introduced to said housing selectively to said separation apparatus and to bypass said separation apparatus, means for rotating said diverter plate selectively between a first position at which said diverter plate is in a first horizontal position at which said diverter plate diverts all of said drilling mud or drilling fluid to said separation apparatus and a second position at which said diverter plate is in a vertical position and diverts all of said drilling mud or drilling fluid under a fixed baffle plate extending beneath said axle and between said opposed side walls of said housing to define an opening between a lower end of said fixed baffle plate and bottom of said housing so that said drilling mud or drilling fluid bypasses said separation apparatus.

2. The bypass diverter box of claim 1, wherein means exterior to said housing is provided for rotating said diverter plate.

3. The bypass diverter box of claim 2, wherein a grate formed of parallel, laterally spaced bars or rods extends transversely between side walls of said housing and into a flow path of said drilling mud or drilling fluid introduced to said separation apparatus.

* * * * *

UNITED STATES PATENT AND TRADEMARK OFFICE
CERTIFICATE OF CORRECTION

PATENT NO.: 6,024,228

DATED: February 15, 2000

INVENTOR(S): J. Terrell WILLIAMS

It is certified that an error appears in the above-identified patent and that said Letters Patent is hereby corrected as shown below:

<u>IN THE ABSTRACT</u>:

Front page, penultimate line, change "folume" to --volume--.

Signed and Sealed this

Twenty-first Day of November, 2000

*Attest:*

Q. TODD DICKINSON

*Attesting Officer*      *Director of Patents and Trademarks*